United States Patent
Sanderson

(10) Patent No.: US 6,989,209 B2
(45) Date of Patent: Jan. 24, 2006

(54) POWER GENERATION METHOD

(75) Inventor: Simon Ralph Sanderson, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 193 days.

(21) Appl. No.: 10/330,748

(22) Filed: Dec. 27, 2002

(65) Prior Publication Data

US 2004/0126640 A1 Jul. 1, 2004

(51) Int. Cl.
*H01M 8/04* (2006.01)
*H01M 2/00* (2006.01)

(52) U.S. Cl. .............. 429/17; 429/34; 429/32; 429/26; 429/38; 429/39

(58) Field of Classification Search .......... 429/17, 429/34, 32, 26, 38, 39
See application file for complete search history.

(56) References Cited

U.S. PATENT DOCUMENTS

| 5,134,043 A | 7/1992 | Nakazawa |
|---|---|---|
| 5,169,730 A | 12/1992 | Reichner et al. |
| 5,208,114 A | 5/1993 | Uematsu et al. |
| 5,543,238 A * | 8/1996 | Strasser ............... 429/17 |
| 5,706,675 A | 1/1998 | Manikowski, Jr. |
| 2001/0014414 A1 | 8/2001 | Okamoto et al. |
| 2001/0014415 A1 | 8/2001 | Lio et al. |
| 2001/0024747 A1 | 9/2001 | Sang |
| 2001/0032630 A1 | 10/2001 | Bircann et al. |
| 2002/0142208 A1 * | 10/2002 | Keefer et al. ......... 429/34 |

FOREIGN PATENT DOCUMENTS

JP 63-152878 * 6/1988

* cited by examiner

*Primary Examiner*—Patrick Joseph Ryan
*Assistant Examiner*—Angela J. Martin
(74) *Attorney, Agent, or Firm*—Penny A. Clarke; Patrick K. Patnode

(57) ABSTRACT

A fuel cell module includes at least one fuel cell stack comprising a number of fuel cell units. An inlet is configured to receive an oxidant flow for supplying the fuel cell stack. An outlet is configured to exhaust an exhaust oxidant flow generated by the fuel cell stack. A recirculation path is configured to convey at least about thirty percent (30%) of the exhaust oxidant flow from the outlet to the inlet as a recirculated exhaust flow, for combination with the new oxidant flow to form the oxidant flow to the fuel cell stack.

15 Claims, 3 Drawing Sheets

POWER GENERATION METHOD

BACKGROUND OF THE INVENTION

The invention relates generally to fuel cell modules and, more particularly, to fuel cell modules for use in combined cycle power generation.

Fuel cells, for example solid oxide fuel cells (SOFCs), are energy conversion devices that produce electricity by electrochemically combining a fuel and an oxidant across an ion conducting layer. Many types of fuel cells, such as SOFCs, have high operating temperatures. For power generation applications, large numbers of fuel cells arranged in stacks are used to generate electric power. Stacks of high temperature fuel cells require large quantities of inlet oxidant, for example air, heated to the operating temperature of the fuel cells, for example in excess of 600 degrees Celsius. In addition, heating occurs within the fuel cell stack, creating a thermal gradient across the stack and thereby subjecting the stack to thermal stresses. The high temperature oxidant exhaust is conveyed downstream.

Presently, heat exchangers are used to transfer some of the excess heat from the exhaust oxidant to the inlet oxidant flow. However, heat exchangers are costly, bulky and possess a limited lifetime, due to the extreme thermal stresses that these devices experience. Accordingly, it would be desirable to design a fuel cell module for use in combined cycle power generation that heats the inlet oxidant flow without using a heat exchanger. It would further be desirable to design a fuel cell module for use in combined cycle power generation having a reduced thermal gradient across the fuel cell stack, to increase the lifetime of the stack.

BRIEF DESCRIPTION

Briefly, in accordance with one embodiment of the present invention, a fuel cell module is disclosed. The fuel cell module includes at least one fuel cell stack comprising a number of fuel cell units. An inlet is configured to receive an oxidant flow for supplying the fuel cell stack. An outlet is configured to exhaust an exhaust oxidant flow generated by the fuel cell stack. A recirculation path is configured to convey at least about thirty percent (30%) of the exhaust oxidant flow from the outlet to the inlet as a recirculated exhaust flow, for combination with the new oxidant flow to form the oxidant flow to the fuel cell stack.

A combined cycle power system embodiment includes at least one fuel cell stack comprising a number of fuel cell units. The combined cycle power system further includes the inlet, outlet and recirculation path. A tail gas burner is adapted to receive a remaining portion of the exhaust oxidant flow from the outlet.

A power generation method includes supplying an oxidant flow to the inlet of the fuel cell module, supplying a fuel flow to the fuel cell module, and recirculating at least about thirty percent (30%) of an exhaust oxidant flow from the outlet of the fuel cell module to the inlet of the fuel cell module as a recirculated exhaust flow. The method further includes combining the recirculated exhaust flow with a new oxidant flow to form the oxidant flow supplied to the inlet. A remaining portion of the exhaust oxidant flow is exhausted from the outlet. The supplying of the oxidant and fuel flows and recirculation of at least about thirty percent (30%) of the exhaust flow are controlled to achieve an equivalence ratio of at least about 0.2.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
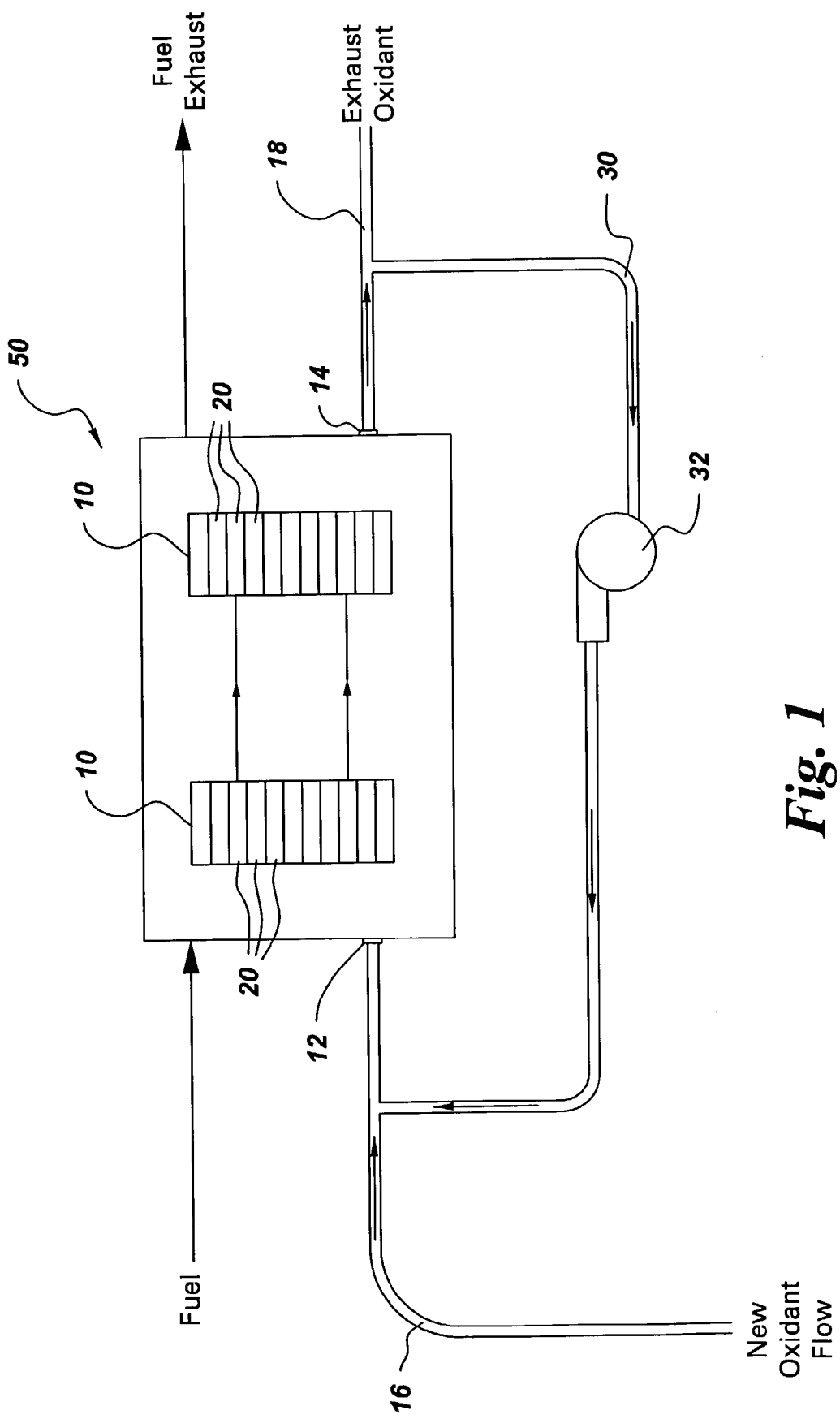
FIG. 1 schematically depicts an exemplary fuel cell module embodiment of the invention.

A fuel cell module 50 embodiment of the invention is described with respect to FIG. 1. As indicated, fuel cell module 50 includes at least one fuel cell stack 10, which includes a number of fuel cell units 20. The exemplary arrangement of two fuel cell stacks 10 shown in FIG. 1 is purely illustrative, and the number and arrangement of fuel cell stacks 10, as well as the number and arrangement of fuel cell units 10 within each stack 10 vary based on the requirements of the specific application, such as desired power output and spatial constraints. Fuel cell module 50 further includes an inlet 12, which is configured to receive an oxidant flow for supplying the fuel cell stacks 10, and an outlet 14, which is configured to exhaust an exhaust oxidant flow generated by the fuel cell stacks 10. Fuel cell module 50 further includes a recirculation path 30, which is configured to convey at least about thirty percent (30%) of the exhaust oxidant flow from outlet 14 to inlet 12, as a recirculated exhaust flow. The recirulated exhaust flow is combined with the new oxidant flow to form the oxidant flow to fuel cell stack 10.

In order to draw the portion of the exhaust oxidant flow from outlet 14 and move this recirculated exhaust flow through recirculation path 30, a fuel cell module 50 according to a particular embodiment further includes a blower 32 positioned in recirculation path 30 and configured to blow the recirculated exhaust flow. Exemplary blowers include radial and/or axial flow turbomachines and fluid entrainment devices, such as ejectors or eductors. The blower 32 may be mechanically or electrically driven.

As indicated in FIG. 1, the exemplary fuel cell module 50 is further configured to receive a fuel flow and to exhaust spent fuel. Both fuel and oxidant are supplied to each of the fuel cell stacks 10. As known to those skilled in the art, this can be accomplished in a variety of ways, and fuel cell module 50 is not limited to any particular arrangement of fuel cell stacks 10.

Fuel cell units 20 are well known and are not described in detail herein. Briefly, fuel cell units 20 (or fuel cells) are energy conversion devices that produce electricity by electrochemically combining a fuel and an oxidant, such as air, across an ion conducting layer. More particularly, each fuel cell unit 20 includes an anode, an electrolyte, and a cathode (not shown), arranged for example in a tubular or planar configuration. Exemplary types of fuel cell units 20 include solid oxide fuel cells 20 (SOFCs), molten carbonate fuel cells 20, and proton exchange membrane fuel cells 20 (PEMs).

Fuel cell module 50 provides a number of benefits. A number of types of fuel cell units 20, such as SOFCs, have high operating temperatures, for example above at least about 600 degrees Celsius for SOFCs. Thus, efficient conversion of the fuel and oxidant within fuel cell stack 10 typically requires inlet 12 temperatures in excess of about 800 degrees Celsius for such high temperature fuel cell units 20. Moreover, the electrochemical processes occurring within fuel cell stack 10 further heat the exhaust oxidant flows, generating a thermal gradient across fuel cell stack 10 and thereby subjecting fuel cell stack 10 to thermal stress, shortening its lifetime. For power systems applications, tremendous volumes of oxidant flow are typically required, for example inlet 12 oxidant flows on the order of hundreds of kilograms/second are typical for power utility sized units. Heating such massive oxidant flows typically requires large heat transfer rates. Several conventional fuel cell stack arrangements use the excess heat of the exhaust oxidant flow to at least partially heat the oxidant flow to the inlet via a heat exchanger (not shown). Briefly, the hot exhaust oxidant flow passes through one chamber of the heat exchanger, while the oxidant flow passes through another chamber of the heat exchanger. The two chambers are separated by a thermally conductive barrier, and heat flows from the hot exhaust oxidant flow to the oxidant flow through the barrier, providing at least a portion of the heat necessary to heat the oxidant flow. Problems associated with this use of heat exchangers include cost, size, losses and the limited lifetime of the heat exchangers due to the large thermal stresses experienced. Beneficially, the fuel cell module 50 of the present invention obviates the use of a heat exchanger by heating the oxidant flow to the inlet 12 by direct mass exchange.

According to a more particular embodiment, fuel cell module 50 further includes an inlet path 16, which is configured to supply a new oxidant flow to inlet 12, as exemplarily shown in FIG. 1. Fuel cell module 50 further includes an exhaust path 18, which is configured to exhaust a remaining portion of the exhaust oxidant flow from outlet 14. For this embodiment, recirculation path 30 is configured to convey at least about fifty percent (50%) of the exhaust oxidant flow from outlet 14 to inlet 12 for combination with the new oxidant flow to form the oxidant flow through inlet 12. Because of the recirculated exhaust flow, the oxidant flow at inlet 12 has a reduced oxygen concentration relative to the oxygen concentration of the new oxidant flow through inlet path 16. More particularly, the oxygen concentration $c_{inlet}$ of the oxidant flow is governed by the following formula:

$$c_{inlet}/c\infty=[1+(1-\phi)BR]/[1+BR],$$

where $\phi$ is the equivalence ratio, which is the stoichiometric fraction of fuel with respect to the oxidant, BR is the blowing ratio of the mass flow, $dm_{30}/dt$, through recirculation path 30 to the mass flow, $dm_{16}/dt$, through inlet path 16, and $c\infty$ is the oxygen concentration of the new oxidant flow (i.e., at the inlet 12 absent any recirculation of the oxidant). The above expression for the oxygen concentration $c_{inlet}$ neglects sight variations in the molecular weight of the exhaust stream with respect to the inlet stream. For example, for an exemplary equivalence ratio $\phi=0.2$ and a blowing ratio BR=1, the ratio of the oxygen concentration at the inlet to that of the new oxidant flow through inlet path 16 is $c_{inlet}/c\infty=90\%$.

According to more particular embodiments, recirculation path 30 is configured to convey at least about seventy-five percent (75%), and still more particularly at least about eighty percent (80%), of the exhaust oxidant flow from outlet 14 to inlet 12. The ratio of recirculated to exhausted oxidant flow varies based on the specific system parameters, such as the flow rates, fuel cell type, and blower power consumption.

Exemplary recirculation paths 30, inlet paths 16, and exhaust paths 18 comprise piping of suitable cross-section to accommodate the oxidant flows, which vary in magnitude depending on the application. Further, the piping is selected to withstand the high temperatures involved, for example to withstand temperatures at least about 800 degrees Celsius. Exemplary high temperature piping materials include ferritic stainless steel, Iron/Chromium (Fe/Cr), Molybdenum/Manganese/Aluminum (Mo/Mn/Al), and Titanium/Yttrium/Lanthanum (Ti/Y/La) alloys, barrier coatings and coated alloys. Such high temperature piping materials are resistant to contamination of the fuel cell.

As noted above, the electrochemical processes occurring within the fuel cell stacks in conventional stack arrangements generate a thermal gradient across the fuel cell stacks, subjecting them to thermal stress and thereby shortening their lifetimes. Beneficially, recirculation of a portion of the exhaust oxidant flow through recirculating path 30 increases the mass flow rate through fuel cell stack 10, reducing the thermal gradient across fuel cell stack 10, thereby reducing the thermal stress on fuel cell stack 10, which increases its lifetime. Moreover, because the oxidant flow is oxygen depleted, the rate of reaction is more uniform across fuel cell stack, further reducing the thermal gradient across the stack 10, and hence reducing the thermal stress on the stack 10. In addition, because the oxidant flow is oxygen depleted, corrosion within fuel cell stack 10 is reduced, enhancing both its lifetime and its resistance to performance degradation. However, oxygen depletion can increase losses due to concentration polarization, so types of fuel cell units 20 for which concentration losses dominate, such as PEM fuel cells may be less desirable than other types of high temperature fuel cells, such as SOFCs and molten carbonate fuel cells, at high recirculation rates (i.e., for increased oxygen depletion).

Figure 2:
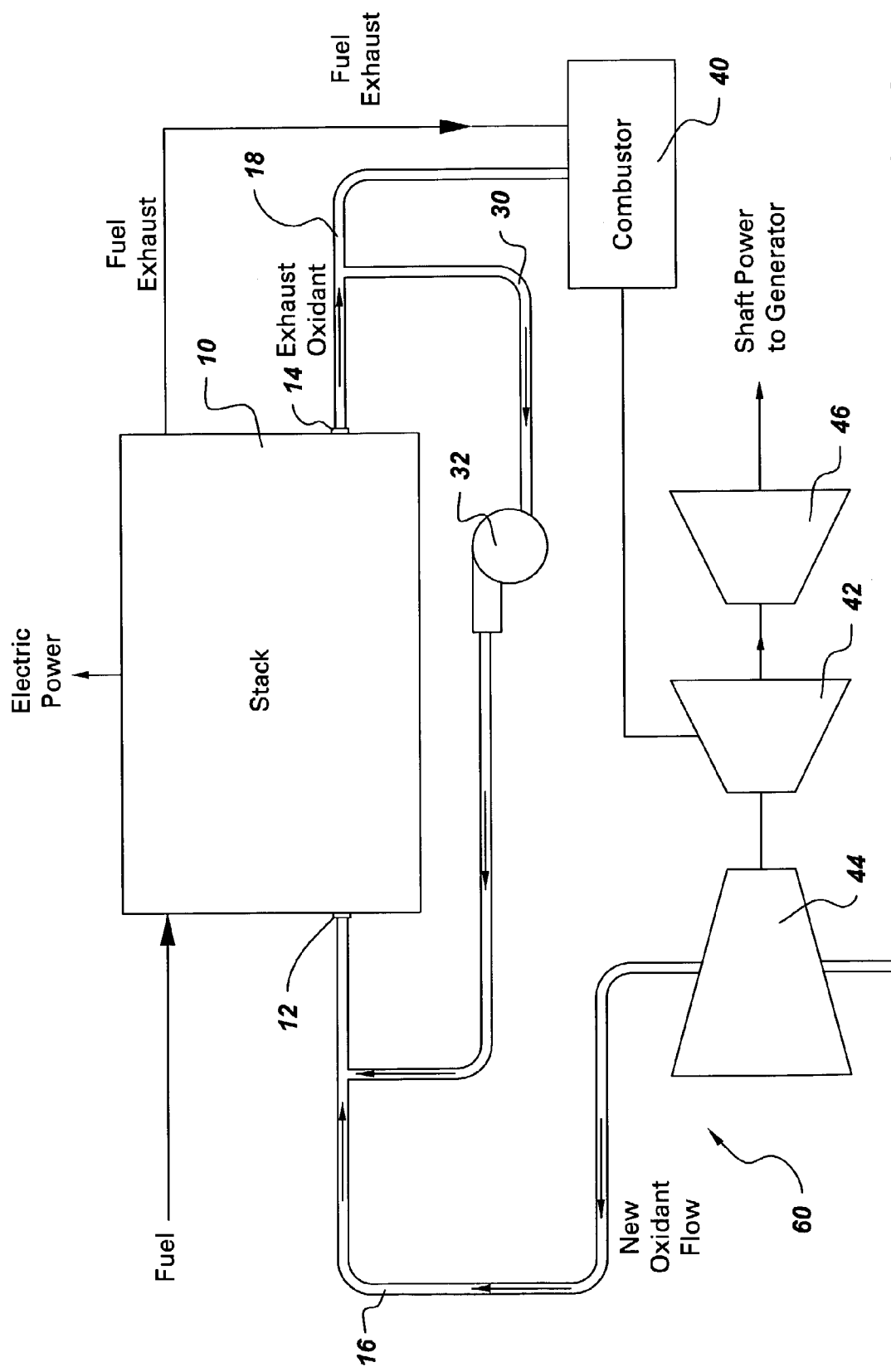
FIG. 2 schematically depicts an exemplary combined cycle power system embodiment of the invention.

The benefits of fuel cell module 50 are enhanced in a combined cycle power generation configuration. An exemplary combined cycle power system 60 embodiment is illustrated in FIG. 2. As shown, combined cycle power system 60 includes at least one fuel cell stack 10 and further includes inlet 12 and outlet 14, all of which are described above with respect to fuel cell module 50. As explained above the number and arrangement of fuel cell stacks 10 vary based on the specific requirements of the power system, such as power output and spatial requirements. Exemplary fuel cell units 20 for the stacks 10 include solid oxide fuel cells (SOFCs) 20 and molten carbonate fuel cells 20. Combined cycle power system 60 further includes a recirculation path 30, which is configured to convey at least about thirty percent (30%) of the exhaust oxidant flow from outlet 14 to inlet 12 as a recirculated exhaust flow. In addition, combined cycle power system 60 includes a tail gas burner (also known as a combustor or anode tail gas oxidizer) 40, which is adapted to receive a remaining portion of the exhaust oxidant flow from outlet 14, as indicated in FIG. 2.

More particularly, the combined cycle power system 60 is further configured to supply a fuel flow to the fuel cell stacks 10 and to exhaust spent fuel from fuel cell stacks 10. As shown, tail gas burner 40 is adapted to receive an exhaust fuel flow from fuel cell stack 10, as indicated in FIG. 2, and to combust the exhaust fuel flow and the remaining portion of the exhaust oxidant flow to produce heat. For this embodiment, combined cycle power system 60 further includes an energy cycle unit 42, which is adapted to receive heat from tail gas burner 40. Exemplary energy cycle units 42 include a steam turbine, a thermoelectric generator, a heat recovery unit, and a Stirling engine. According to a particular embodiment, energy cycle unit 42 is a gas turbine 42. For the embodiment shown in FIG. 2, energy cycle unit 42 is a gas turbine 42, and combined cycle power system 60 further includes a compressor 44 for compressing an oxidant, such as air, to supply a new oxidant flow to inlet 12. For the particular embodiment illustrated, gas turbine 42 is configured to power compressor 44. For another particular embodiment, also illustrated by FIG. 2, combined cycle power system 60 further includes a bottoming cycle unit 46, for example a steam turbine 46, adapted to receive heat from energy cycle unit 42, for example a gas turbine 42.

In order to draw the portion of the exhaust oxidant flow from outlet 14 and move this recirculated exhaust flow through recirculation path 30, a combined cycle power system 60 according to a particular embodiment further includes a blower 32 positioned in recirculation path 30 and configured to blow the recirculated exhaust flow. According to a more particular embodiment, energy cycle unit 42 is configured to power blower 32, either directly or indirectly (for example, via a motor).

According to a particular embodiment, inlet 12, outlet 14, recirculation path 30, and blower 32 are adapted to achieve an equivalence ratio $\phi$ of at least about 0.2 and more particularly, of at least 0.3 or 0.4. As noted above, the equivalence ratio $\phi$ is the stoichiometric fraction of fuel with respect to the oxidant. For conventional fuel cell arrangements, equivalence ratios are typically limited to $\phi=0.2$ or less, to provide adequate air-cooling for the fuel cell stack. However, the incorporation of recirculation path 30 into combined cycle power system 60 desirably permits selection of higher equivalence ratios, while providing adequate air-cooling for the stack 10. For combined cycle power system 60, it is desirable to adapt inlet 12, outlet 14, recirculation path 30, and blower 32 to achieve about the maximum equivalence ratio for the energy cycle unit 42. In this manner, the temperature of the combusted fuel cell module tail gases is raised to about the maximum allowable turbine inlet temperature, thereby increasing the efficiency of the conversion of fuel cell tail gases into additional power system 60 output. By "adapted," it is meant that the recirculation path 30 and inlet 12 and outlet 14 (and the associated piping) are sized and fitted with controls, for example valves (not shown), to convey and control the respective fuel and oxidant flow rates to achieve the desired equivalence ratio $\phi$. Similarly, blower 32 is controlled to provide a blowing ratio BR, of the mass flow, $dm_{30}/dt$, through recirculation path 30 to the mass flow, $dm_{16}/dt$, through inlet path 16, to achieve the desired equivalence ratio $\phi$.

In addition to the benefits discussed above with respect to fuel cell module 50, an additional benefit of combined cycle power system 60 is that tail gas burner 40 incinerates the exhaust fuel flow from fuel cell stacks 10 in the exhaust oxidant flow from fuel cell stacks 10 at a higher flame temperature due to the reduced net oxidant flow required to thermally manage the stack(s) 10, increasing the efficiency of energy cycle unit 42. In other words, by recirculating at least a portion of the exhaust gas flow to inlet 12, and more particularly by recirculating large portions of the exhaust gas flow to inlet 12, the overall cycle equivalence ratio $\phi$ is increased. The overall cycle equivalence ratio $\phi$ is a key driver for efficiency gain in energy cycle unit 42 and hence for combined cycle power system 60.

Figure 3:
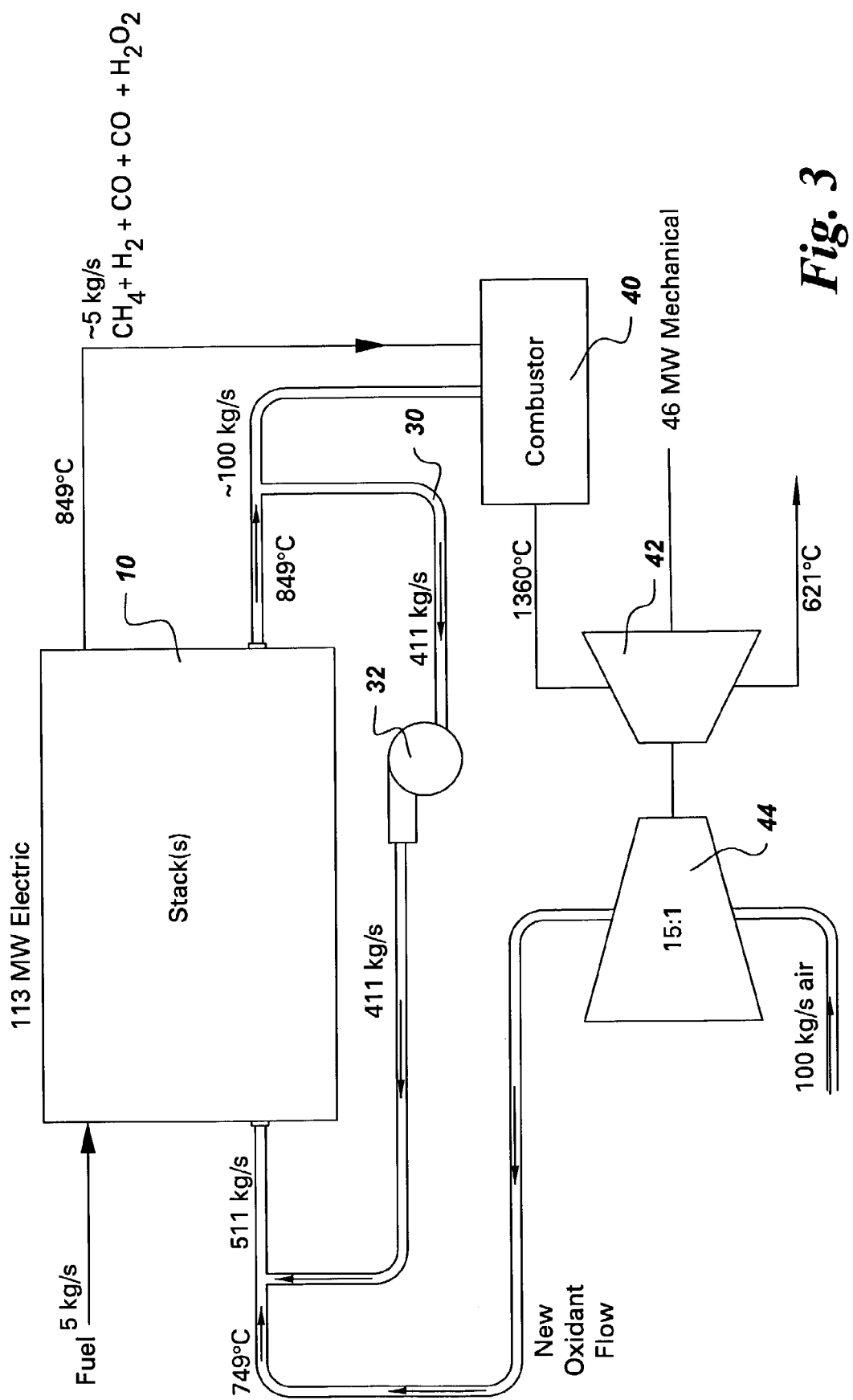
FIG. 3 illustrates an exemplary application of the combined cycle power system of FIG. 2.

The example of combined cycle power system 60 shown in FIG. 3 is provided for purely illustrative purposes. The specific temperatures, ratios, and volumes will vary based on system requirements. For this specific example, air is supplied to compressor 44, which operates at a compression ratio of about 15:1 to supply a new oxidant flow of about 100 kg/s of compressed air to inlet 12. About 411 kg/s of the exhaust oxidant through outlet 14, which exhaust is at a temperature of about 849 degrees Celsius, is recirculated via recirculation path 30 and mixed with the new oxidant flow. This corresponds to an oxidant recirculation ratio of about eighty percent (80%) (and to a blowing ratio of about 411%) and raises the inlet oxidant temperature to about 749 degrees Celsius. The remaining portion of the exhaust oxidant flow, about 100 kg/s, is exhausted to combustor 40 with the spent fuel, with both the spent fuel and the exhaust oxidant having a temperature of about 849 degrees Celsius. Combustor 40 burns the spent fuel with the exhaust oxidant to drive a gas turbine 42 at an inlet temperature of about 1360 degrees Celsius.

For the example of FIG. 3, the cell voltage for each of the fuel cell units 20 is about 0.7 V, the stack 10 efficiency is about fifty percent (50%), and the fuel utilization of the stack 10 is about seventy five percent (75%). The fuel cell units 20 are SOFCs. The average temperature within the stack 10 is about 800 degrees Celsius, and the thermal gradient across the stack 10 is about 100 degrees Celsius. The cycle efficiency, assuming ideal thermodynamics and ninety percent (90%) polytropic efficiency for the turbomachinery, is about seventy percent (70%), with a fuel cell work split of about 71% and a turbine work split of about 29%. Higher efficiencies are enabled by capturing the heat rejected by the energy cycle unit 42 (at 620 degrees Celsius) in bottoming cycle unit 46 (for example, in a steam turbine 46), as indicated in FIG. 2.

A power generation method embodiment of the invention is described with reference to FIGS. 1 and 2. As indicated in FIG. 1, the power generation method includes supplying an oxidant flow to inlet 12 of fuel cell module 50. The power generation method further includes supplying a fuel flow to the fuel cell module 50 and recirculating at least about thirty percent (30%) of an exhaust oxidant flow from outlet 14 to inlet 12, as a recirculated exhaust flow. The supply of the oxidant and fuel flows and recirculation of at least about thirty percent (30%) of the exhaust flow are controlled to achieve an equivalence ratio of at least about 0.2. The power generation method also includes exhausting a remaining portion of the exhaust oxidant flow from outlet 14.

For a particular embodiment, the power generation method further includes blowing the recirculated exhaust flow at a blowing ratio BR. For this embodiment, the supply of the oxidant and fuel flows are controlled, and the blowing ratio BR is selected to achieve an equivalence ratio of at least about 0.2 and, more particularly, of at least about 0.3, 0.4 or 0.5. As noted above, the recirculation of a portion of the exhaust flow to inlet 12 permits running at a higher equivalence ratio $\phi$, while providing adequate air cooling of the fuel cell stacks 10. Consequently, a higher efficiency for the overall cycle is achieved.

For the embodiment depicted in FIG. 2, the power generation method also includes supplying the remaining portion of the exhaust oxidant flow to combustor 40, supplying an exhaust fuel flow from fuel cell module 50 to combustor 40, combusting the exhaust fuel flow with the remaining portion of the exhaust oxidant flow to generate heat, and supplying the heat to energy cycle unit 42. Beneficially, the reduced overall oxidant flow required to thermally manage the stacks 10 increases the flame temperature at which combustor 40 incinerates the exhaust fuel flow from the fuel cell module 50, increasing the efficiency of energy cycle unit 42.

For a more particular embodiment, the supply of the oxidant and fuel flows are controlled, and the blowing ratio BR is selected to achieve about the maximum equivalence ratio for the energy cycle unit 42. The equivalence ratio is limited by the allowable inlet temperature of energy cycle unit 42. Thus, "maximum equivalence ratio" refers to the maximum equivalence ratio allowable under the constraint of the maximum allowable inlet temperature of energy cycle unit 42.

Although only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A power generation method comprising:
   supplying an oxidant flow to an inlet of a fuel cell module, the fuel cell module comprising at least one fuel cell stack, the fuel cell stack including a plurality of fuel cells;
   supplying a fuel flow to the fuel cell module;
   recirculating at least thirty percent (30%) of an exhaust oxidant flow from an outlet of the fuel cell module to the inlet of the fuel cell module as a recirculated exhaust flow;
   blowing the recirculated exhaust flow at a blowing ratio BR;
   combining the recirculated exhaust flow with a new oxidant flow to form the oxidant flow supplied to the inlet of the fuel cell module; and
   exhausting a remaining portion of the exhaust oxidant flow from the outlet,
   wherein said supplying of the oxidant and fuel flows and said recirculation of at least thirty percent (30%) of the exhaust flow are controlled to achieve an equivalence ratio of at least 0.3.

2. The power generation method of claim 1, wherein said supplying of the oxidant and fuel flows are controlled and the blowing ratio BR is selected to achieve an equivalence ratio of at least 0.4.

3. The power generation method of claim 1, further comprising:
   supplying the remaining portion of the exhaust oxidant flow to a combustor;
   supplying an exhaust fuel flow from the fuel cell module to the combustor;
   combusting the exhaust fuel flow with the remaining portion of the exhaust oxidant flow to generate heat; and
   supplying the heat to an energy cycle unit.

4. The power generation method of claim 3, wherein said supplying of the oxidant and fuel flows are controlled and the blowing ratio BR is selected to achieve about the maximum equivalence ratio for the energy cycle unit.

5. The power generation method of claim 1, wherein each of the fuel cells are selected from the group consisting of a solid oxide fuel cell (SOFC), a molten carbonate fuel cell, and a proton exchange membrane fuel cell.

6. The power generation method of claim 5, wherein each of the fuel cells comprises a SOFC.

7. The power generation method of claim 1, wherein said recirculating comprises recirculating at least fifty percent (50%) of the exhaust oxidant flow from the outlet of the fuel cell module to the inlet of the fuel cell module as the recirculated exhaust flow.

8. The power generation method of claim 7, wherein said recirculating comprises recirculating at least seventy-five percent (75%) of the exhaust oxidant flow from the outlet of the fuel cell module to the inlet of the fuel cell module as the recirculated exhaust flow.

9. The power generation method of claim 8, wherein said recirculating comprises recirculating at least eighty percent (80%) of the exhaust oxidant flow from the outlet of the fuel cell module to the inlet of the fuel cell module as the recirculated exhaust flow.

10. The power generation method of claim 3, wherein the energy cycle unit is selected from the group consisting of: a steam turbine, a thermoelectric generator, a heat recovery unit, and a Stirling engine.

11. The power generation method of claim 3, wherein the energy cycle unit comprises a gas turbine.

12. The power generation method of claim 3, further comprising receiving heat from the energy cycle unit using a bottoming cycle unit.

13. The power generation method of claim 12, wherein the energy cycle unit comprises a gas turbine and the bottoming cycle unit comprises a steam turbine.

14. The power generation method of claim 3, further comprising:
   compressing an oxidant using a compressor for supplying a new oxidant flow to the inlet; and
   powering the compressor using the energy cycle unit.

15. The power generation method of claim 3, wherein said blowing is performed using a blower, the power generation method further comprising powering the blower using the energy cycle unit.

* * * * *